US012764123B2

(12) United States Patent
Woodworth et al.

(10) Patent No.: US 12,764,123 B2
(45) Date of Patent: Oct. 13, 2026

(54) SYSTEMS AND METHODS FOR AUTOMATIC ISOLATION OF ELECTRONIC DEVICES

(71) Applicant: CenturyLink Intellectual Property LLC, Broomfield, CO (US)

(72) Inventors: John R.B. Woodworth, Amissville, VA (US); Dean Ballew, Sterling, VA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 516 days.

(21) Appl. No.: 18/363,395

(22) Filed: Aug. 1, 2023

(65) Prior Publication Data

US 2024/0073217 A1 Feb. 29, 2024

Related U.S. Application Data

(60) Provisional application No. 63/374,067, filed on Aug. 31, 2022.

(51) Int. Cl.
*G06F 21/00* (2013.01)
*H04L 9/40* (2022.01)

(52) U.S. Cl.
CPC ............ *H04L 63/107* (2013.01); *H04L 63/20* (2013.01)

(58) Field of Classification Search
CPC ... H04L 63/107; H04L 63/20; H04L 63/0236; H04L 63/0263; H04L 63/101
See application file for complete search history.

(56) References Cited

U.S. PATENT DOCUMENTS

2017/0078922 A1* 3/2017 Raleigh .................... H04L 69/18
2017/0214709 A1* 7/2017 Maestas .............. H04L 63/1433
2023/0115472 A1* 4/2023 Venkataramani ....... H04L 63/20 726/15
2023/0231860 A1* 7/2023 Tian .................... H04L 63/1416 726/1
2026/0088929 A1* 3/2026 Yunusov ............... H03M 13/09

* cited by examiner

*Primary Examiner* — Kendall Dolly

(57) ABSTRACT

Computer networks may include various devices including computing devices (such as laptop computers or tablets), file servers, and printers. Also connected to such networks may be other internet-capable devices such as Internet of Things devices and Industrial Internet of Things devices. As such, systems and methods for automatic isolation of electronic devices are provided based on categorization of such devices.

19 Claims, 5 Drawing Sheets

SYSTEMS AND METHODS FOR AUTOMATIC ISOLATION OF ELECTRONIC DEVICES

CROSS-REFERENCE TO RELATED APPLICATIONS

This application claims the benefit of U.S. Provisional Application No. 63/374,067 filed Aug. 31, 2022, entitled "Systems and Methods for Automatic Isolation of Electronic Devices," which is incorporated herein by reference in its entirety.

FIELD

One or more aspects of embodiments according to the present disclosure relate to networks, and more particularly to systems and methods for automatic isolation of electronic devices.

BACKGROUND

Computer networks may include various devices including computing devices (such as laptop computers or tablets), file servers, and printers. Also connected to such networks may be other internet-capable devices such as Internet of Things devices and Industrial Internet of Things devices.

It is with respect to this general technical environment that aspects of the present disclosure are related.

SUMMARY

In an aspect, a method is provided comprising: receiving, by a security device, from a first device, a request to communicate with a second device; determining that the requested communication is not authorized; and not complying with the request. In examples, determining that the requested communication is not authorized comprises: determining that the first device is a member of a first category of devices; determining that the second device is a member of a second category of devices, different from the first category of devices; and applying, by the security device, a rule prohibiting the first category of devices from communicating with the second category of devices.

In another aspect, a routing device is provided comprising: at least one processor; and memory, operatively connected to the at least one processor and storing instructions that, when executed by the at least one processor, cause the routing device to perform a method. In examples, the method comprises: receiving operator input defining permissions for a first category of devices and a second category of devices that is different from the first category of devices; determining, based on the operator input, a rule prohibiting the first category of devices from communicating with the second category of devices; receiving, from a first device, a packet addressed to a second device; classifying the first device as a member of the first category of devices; classifying the second device as a member of the second category of devices; and dropping, based on the rule, the packet.

In another aspect, a security device is provided, comprising: at least one processor; and memory, operatively connected to the at least one processor and storing instructions that, when executed by the at least one processor, cause the routing device to perform a method. In examples, the method comprises: receiving, from a first device, a request to communicate with a second device; determining that the requested communication is not authorized; and not complying with the request. In examples, the determining that the requested communication is not authorized comprises: determining that the first device is a member of a first category of devices; determining that the second device is a member of a second category of devices, different from the first category of devices; and applying, by the security device, a rule prohibiting the first category of devices from communicating with the second category of devices.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of systems and methods for automatic isolation of electronic devices provided in accordance with the present disclosure and is not intended to represent the only forms in which the present disclosure may be constructed or utilized. The description sets forth the features of the present disclosure in connection with the illustrated examples. It is to be understood, however, that the same or equivalent functions and structures may be accomplished by different examples that are also intended to be encompassed within the scope of the disclosure. As denoted elsewhere herein, like element numbers are intended to indicate like elements or features.

In various commercial or residential networks, the presence of a vulnerable internet-connected device may present a risk or a threat to other devices on the network, or to the entire network. For example, in a residential network, an Internet of Things (IoT) device (e.g., a thermostat, or a security camera, or an entertainment device, etc.) that has one or more vulnerabilities may be compromised by a malicious actor and may then be controlled by the malicious actor (i) to exhibit undesirable behavior (e.g., to participate in attacks, such as distributed denial of service attacks), (ii) to attempt to compromise other devices on the network, or (iii) to interfere with the operation of the network (e.g., in a wireless (e.g., WiFi) network, to interfere with the wireless transmissions of other devices on the network). In a commercial network, the consequences of a successful attack by a malicious actor may be even more significant. For example, in an Industrial Internet of Things (IIoT) system (e.g., in a factory), a malicious actor that gains control of industrial equipment may be able to shut down production, damage equipment, or cause injuries to workers in the facility.

In an industrial setting, for example, an employee may bring an internet-capable audio-streaming device into a break room at a facility and connect it to a WiFi network at the facility, so that the employee (and other employees) may listen to music in the break room. If a malicious actor is able to exercise control of the audio-streaming device (which may not have been designed with security as an important design criterion), then it may be possible for the attacker to use the audio-streaming device as a starting point from which to launch attacks on, e.g., IIoT devices in the facility, such as computer numerically controlled (CNC) machines or other equipment.

Figure 1:
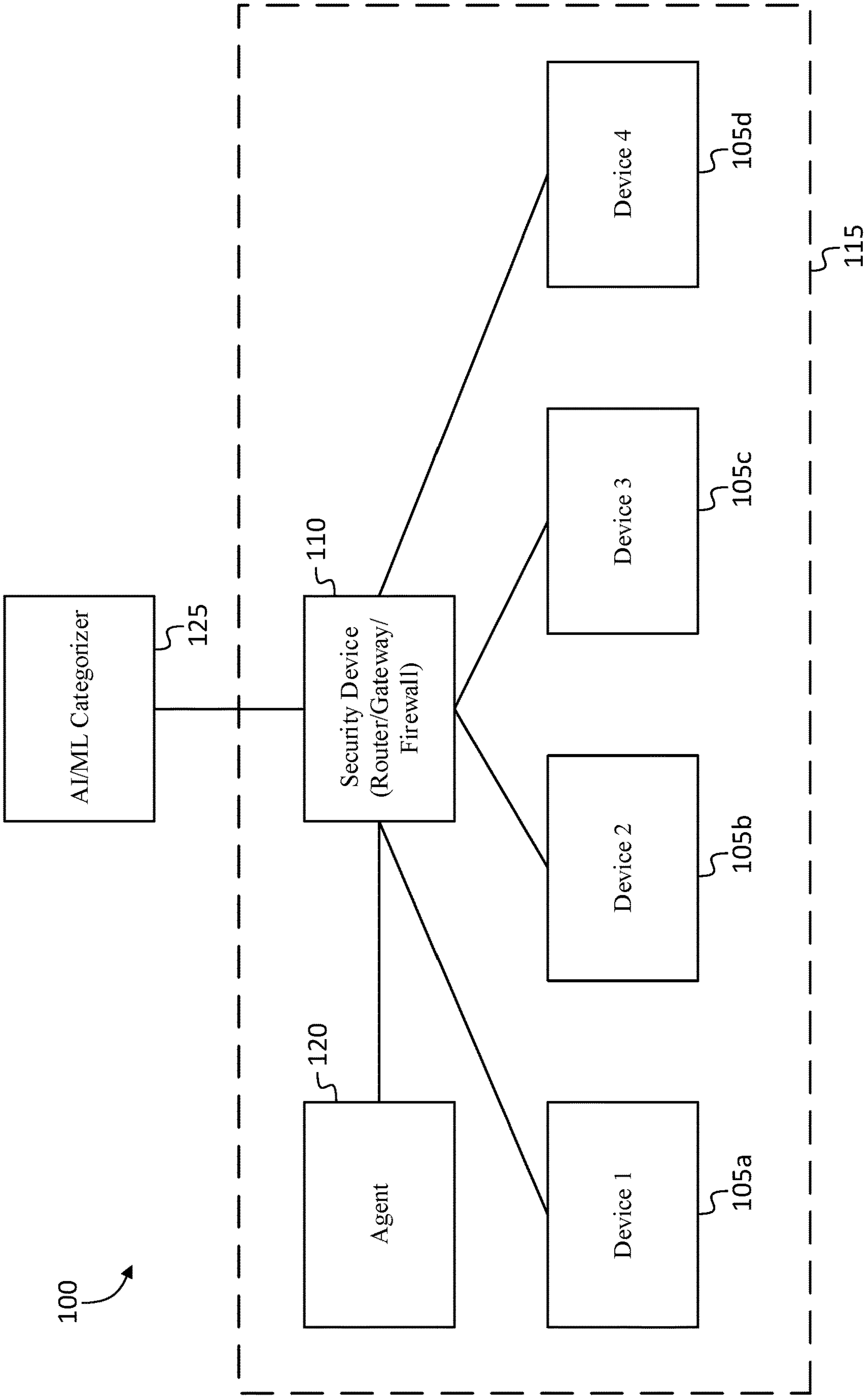
FIG. 1 is a block diagram of a portion of a network, according to an example of the present disclosure.

FIG. 1 shows a network 100 (e.g., a residential network, or a corporate network, or an industrial network) in some examples. One or more internet-capable devices (e.g., devices 105*a* 105*b*, 105*c*, 105*d*, collectively referred to as devices 105) are connected to a security device 110. The security device 110 may be a router, a gateway, a firewall, or another device that may forward packets (e.g., ethernet frames) between the devices 105 or between a device 105 and the Internet or other wide area network (WAN). The connections to the security device 110 may be wired (e.g., ethernet) or wireless (e.g., WiFi) connections. The devices 105 and the security device 110 may be part of a broadcast domain 115 (which may comprise a security domain that is subject to a set of security policies, e.g., a Local Area Network (LAN) or a corporate network). For example, the security device may comprise a router, a gateway, a firewall or other device that enforces some or all of the security policies for the broadcast domain 115 of which devices 105 are members.

In operation, the security device 110 may store and apply a set of rules constraining the ability of the devices 105 to communicate with each other (e.g., by granting certain permissions to each device 105). For example, each device 105 may be classified (as discussed in further detail below) as being a member of a category, and when a first device 105*a* sends, to the security device 110, a request to communicate with a second device 105*b*, the security device 110 may determine whether to comply with the request based in part on the category of the first device 105*a* and the category of the second device 105*b* and the rules applicable to each such category.

For example, in a factory, a number of categories may be defined, including (i) manufacturing equipment devices 105 (e.g., network-connected CNC machines), (ii) facilities equipment devices 105 (e.g., network-connected heating and air conditioning equipment, fire alarms, and badge access equipment), (iii) administrative equipment devices 105 (e.g., computers and printers), (iv) file servers, and (v) entertainment equipment devices 105 (such as an audio-streaming device 105). In this setting, it may be appropriate, for example, for the manufacturing equipment devices 105 to communicate with each other and with the file servers, and for the administrative equipment devices 105 to communicate with the file servers. It may however not be appropriate or necessary, for example, for the entertainment equipment devices 105 to communicate with the manufacturing equipment devices 105. As such, the rules set for each category may define whether device(s) in such categories are permitted to communicate with other devices within the same category and/or other devices in other particular categories. For example, the security device 110 may (i) comply with a request, from a first manufacturing equipment device 105, to communicate with a second manufacturing equipment device 105 and (ii) not comply with a request, from an entertainment equipment device 105, to communicate with a manufacturing equipment device 105. In some examples, as used herein, each category may be defined according to the function the devices in the category perform (e.g., manufacturing operations, facilities operations, serving files, or providing entertainment). In other examples, each category may be defined according to the effects a device may have, e.g., (i) physical effects for manufacturing equipment devices 105 facilities equipment devices 105, (ii) data processing effects for printers, and certain computers and file servers, (iii) financial effects, e.g., for devices (e.g., computers) configured to effect financial transactions (e.g., sending invoices or making bank transactions) and (iv) entertainment effects, for devices 105 that provide entertainment to users. In other examples, the categories may be defined based on specific manufacturers or specific device identifiers, among other possibilities.

A request to communicate may take any of several forms. For example, a first device 105 in the broadcast domain 115 may send, to the security device 110, an Address Resolution Protocol (ARP) request to learn the Media Access Control (MAC) address of a second device 105 in the broadcast domain 115; if communications from the first device 105 to the second device 105 are not authorized under the rules of the security device 110 (which may be specified, to the security device 110, by an agent, as discussed in further detail below), then the security device 110 may not comply with the ARP request (and, e.g., drop the ARP request, or report (e.g., log) the unauthorized ARP request and then drop it)). As another example, if a first device 105 sends, to the security device 110, a packet addressed to a second device 105 in the broadcast domain 115, and if communications from the first device 105 to the second device 105 are not authorized under the rules of the security device 110, the security device 110 may drop the packet (e.g., and report (e.g., log) the attempt to send an unauthorized packet). The rules of the security device 110 may include (e.g., consist of) a set of permissions defined for each device 105 (which may be a set of permissions defined for the entire category of devices 105 of which the device 105 is a member). The permissions may be defined, for example, as lists of permissions and prohibitions for communications intra-category and/or inter-category, with a suitable order of application (so that later-applied prohibitions may override certain permissions, for example, or vice versa).

The categorizing (or "classifying") of devices 105 may be performed in various ways. For example, an agent 120 may perform a portion of the categorization. The agent 120 may be or include an application (e.g., a piece of software) running on the security device 110, or in one or more of the devices 105 (e.g., in a computing device), or on an edge server (e.g., a server that is not part of the broadcast domain 115 but is connected to the broadcast domain 115 through a short internet connection).

Passive or active methods may be used (e.g., by the agent 120) to categorize devices 105. Passive methods for characterizing a device 105 may include, for example, monitoring the activity of a device 105, e.g., (i) a device making, or attempting to make, a connection to an internet service (e.g., a streaming audio service, for an audio-streaming device 105), or (ii) a device advertising its services (e.g., using multicast DNS (mDNS)), or (iii) a device attempting to connect to a particular port (e.g., ports 445 and 139) of another device 105 to establish a local file and printer sharing protocol.

Active methods for characterizing (also referred to as classifying) a device 105 may include polling a device for information, such as the device's MAC address or other identifiers indicative of the device's intended function. Active methods may also include scanning (e.g., by the agent 120) certain ports of a device 105 to determine which ports are open. Scanning a port may involve attempting to build a connection to the port. If the response from the device 105 is the first step of a three-way handshake (for a TCP connection), the agent 120 may conclude that the port is open; if the response is an Internet Control Message Protocol (ICMP) message indicating that the port is not available or if there is no response (and the attempt times out), the agent 120 may conclude that the port is not open. The categorization of a device 105 may also be based (entirely or in part) on input from an operator. For example, when a new manufacturing equipment device 105 (a new piece of network-connected manufacturing equipment) is added to a factory floor, an operator (e.g., a foreman) may, as part of the process of setting up the piece of equipment, inform the agent 120 (e.g., via a suitable interface, such as a page served by the agent 120 to a browser with which the operator interacts) of the category to which the new device 105 (the new manufacturing equipment device 105) belongs.

An artificial intelligence (AI) (e.g., machine learning (ML)) categorizer 125 may be employed to categorize the devices 105 based on information (e.g., characterizations of the devices 105) obtained, by the agent 120, using, for example, active or passive methods, or operator input, as discussed above. The AI categorizer 125 may be or include an AI/ML model running on the security device 110, or in one or more of the devices 105 (e.g., in a computing device), or on an edge server, or elsewhere on a different network communicatively connected to the security device 110. The model of the AI categorizer 125 may be trained (e.g., by a party providing AI categorizers 125 to various enterprises) using supervised training with respective characteristics of each of a plurality of sets of known devices 105, each set including devices 105 in a respective category. The AI categorizer 125 may report, along with a proposed categorization for a device 105, a confidence level for the categorization, the confidence level being an estimate of the likelihood that the categorization is correct. The training may be performed or supplemented in operation; for example, if an operator determines that a device 105 has been incorrectly categorized, the operator may override the categorization performed by the AI categorizer 125, the characteristics of the device 105, with its correct categorization, may be made part of the training data set, and the training of the AI categorizer 125 may be updated accordingly. The training of the AI categorizer 125 may be performed, e.g., using linear regression, decision tree training, neural network training, or the like. The training may be supervised or unsupervised. In examples, if the security device allows or rejects an attempt by a device 105 to communicate with another device 105, it may be logged and presented to a user. For example, agent 120 may cause the presentation of a user interface, send an electronic message through security device 110 to one of the devices 105 or another device, or otherwise communicate the allowances/denials. In examples, a user is then presented an opportunity (e.g., via a user interface input component, a link in an electronic communication, or otherwise) to provide feedback regarding with the allowances/denials were proper and/or to override any allowances or denials that were improper or unwanted. In examples, such feedback may include whether one or more of the devices 105 have been miscategorized. Such feedback may then be used by the AI/ML model of the categorizer 125 to improve such model for future decisions and/or categorizations.

In some examples, when a device 105 is first connected to the network 100, it is initially categorized into a category for new devices 105 (devices newly connected to the network 100). Devices 105 in this category may be isolated by default and capable of sending packets only to (i) the security device 110 or (ii) the security device 110 and, through the security device 110, the internet (other devices 105 may also be prohibited from sending packets to new devices 105). In such an example, various devices 105, such as mobile telephones or audio-streaming devices 105 may be capable of operating normally, while in the category for new devices 105, without posing a threat to other devices 105 in the broadcast domain 115. Such a device 105 may subsequently be categorized into another category, e.g., as a result of a characterization that may later be performed by the agent 120, or as a result of an override by an operator.

In some examples, the categorization of some or all of the devices 105 is periodically re-checked. A change in the categorization of a device 105 may be an indication that a device 105 has been compromised (and that its characteristics have changed, as a result of being compromised, resulting in the change in categorization or in a change of confidence value associated with such categorization). As such, if the categorization (or a confidence value for a categorization) of a device 105 changes, the agent 120 may grant the device 105 a different (e.g., reduced) set of permissions. For example, the agent may recategorize the device 105 as a new device or a different type of device and restrict its permissions accordingly. The agent may also report (e.g., log) the detected change in categorization, and the measures taken to protect the network.

Similarly, a change (e.g., a reduction) in the confidence with which the AI categorizer 125 is able to categorize the device 105 may indicate that the device 105 was not correctly categorized initially and may trigger similar measures (e.g., granting the device 105, by the agent 120, a different (e.g., reduced) set of permissions) to protect the network 100. For example, a device 105 (e.g., an audio-streaming device 105) that is already compromised when first connected to the network 100 may masquerade as, or "spoof" a device 105 in another category (e.g., it may exhibit the characteristics of a manufacturing equipment device 105, for the purpose of being categorized as such). If the device 105 then exhibits behaviors that are not typical for devices 105 that are genuinely in the category (e.g., if it attempts to push firmware updates to other devices 105 in the category), it may fit less well into the model the AI categorizer 125 has for such devices 105, resulting in a downgrading of the confidence value the AI categorizer 125 reports for the categorization.

An operator (e.g., an administrator) may participate in various ways in the categorization of devices 105 and in the setting of rules enforcing different permissions to devices 105 in different categories. For example, the operator may specify the set of categories to be used, or accept default categories that the agent may use, or accept some default categories and override others. As another example, the operator may accept default rules that the agent may use (for specifying the permissions of devices 105 in each category) or override the rules for some categories, or for some devices 105. For example, such an override may prevent some devices 105 from communicating with other devices 105 in the same category (e.g., if a CNC machine has no need to collaborate with other CNC machines it may not be permitted, or "authorized" to communicate with other manufacturing equipment devices 105). As another example, such an override may allow some devices 105 to communicate with devices 105 in other categories (e.g., a CNC machine may be authorized to communicate with the file servers (from which it may retrieve data files for manufacturing operations to be performed)). In some examples the system is fully automated, and no operator participation is required.

Figure 2A:
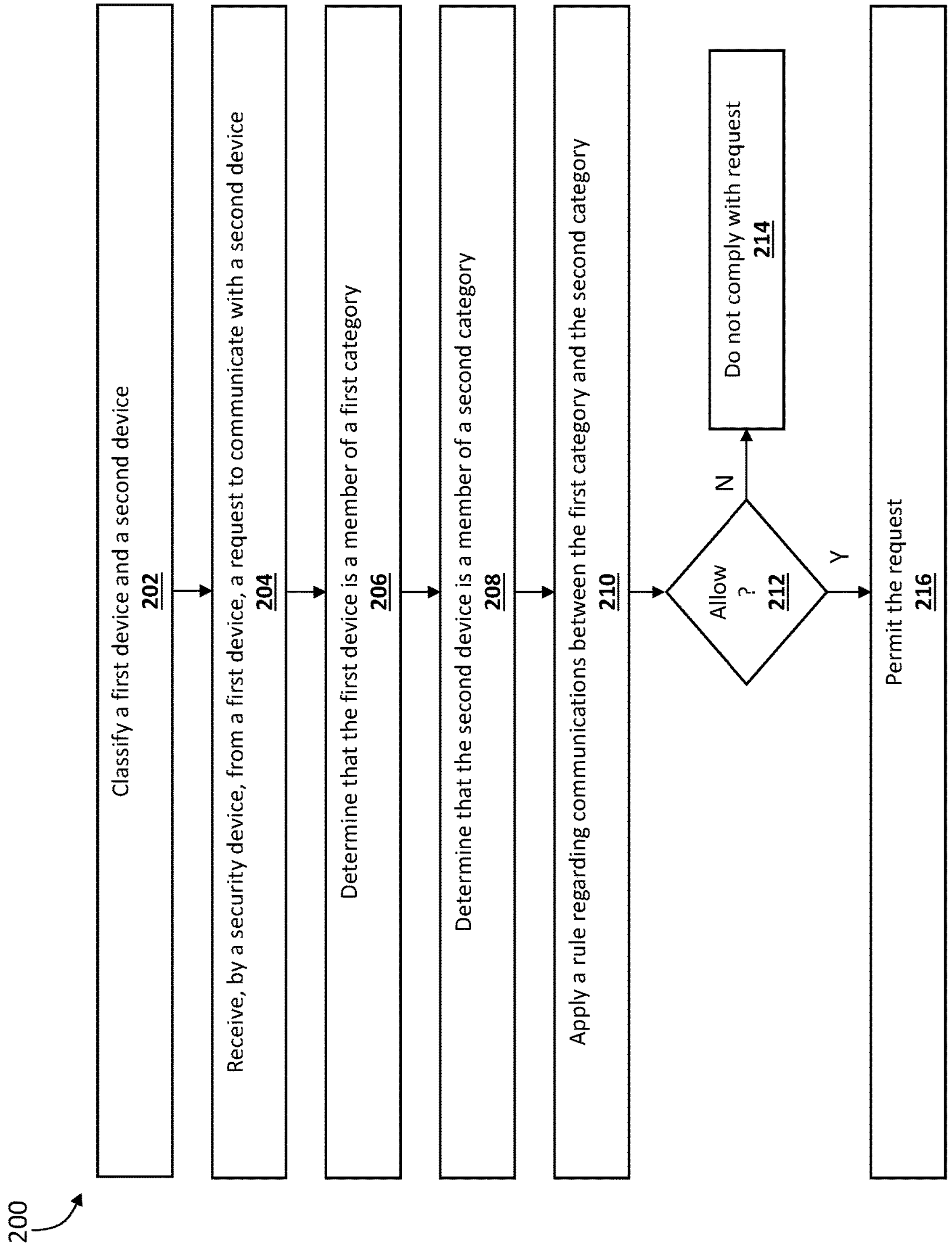
FIG. 2A is a flow chart of a method, according to an example of the present disclosure.

FIG. 2A is a flow chart of a method 200, in some examples. In examples, the method may be performed by one or more of categorizer 125, security device 110, and agent 120. The method may include classifying, at 202, a first device and a second device, such as devices 105*a* and 105*b*. As discussed, categorization of the devices 105 may be active or passive and may be performed by a machine-learning categorizer 125, among other examples, based on information obtained or inferred about the nature of the device 105. In some examples, operation 202 may include port scanning of device 105.

At operation 204, a request from a first device to communicate with a second device is received by the security device. In some examples, the security device may be a router implementing a local area network, and the request to communicate may include a packet received by the router and addressed to the second device. In other examples, the request to communicate may comprise an address resolution request, among other examples.

At operation 206, a determination is made that the first device is a member of a first category. For example, the agent 120 and/or security device 110 may store a list of devices connected to the security device and categorizations for each. In examples, the categorization may be updated periodically, e.g., by the categorizer 125. As discussed, if the agent and/or security device 110 does not have a stored category for the device 105, the device may be categorized in a "new device" category. At operation 208, the second device is similarly categorized, e.g., as a member of a second category.

At operation 210, a rule is applied regarding communications between the first category and the second category. For example, the agent 120 and/or security device 110 may store a set of permissions applicable to each category, including the first category and the second category. In examples, the permissions may delineate whether one category of device is permitted to communicate with another category of devices. In some examples, the rules for communications between categories may be based on parameters beyond just the category of each device. For example, a first device classified in a first category may be permitted to communicate with a second device classified in the second category, but only if the categorizer 125 provides at least a minimum confidence score that the first device is, in fact, correctly classified into the first category. In examples, if the confidence score does not meet the minimum threshold, even if the first category is generally permitted to communicate with the second category, a rule tied to a confidence value may still prohibit communication from a first-category device to a second-category device. In addition, in some examples, the rule may specify a particular type of communication (e.g., payload, format, etc.) that is permitted between devices in different categories, while prohibiting other types of communication.

At decision operation 212, a determination is made whether to allow the communication. If the rule prohibits the communication, flow branches "no" to operation 214, where the request is not complied with. In examples, this may include dropping the packet (or other type of communication) and/or redirecting the communication to a separate server so that the activity of the device 105 sending the communication can be observed. If the rule permits the communication, flow branches "yes" to operation 216, where the request is permitted (e.g., by forwarding the packet or other request to communicate to the second device).

Figure 2B:
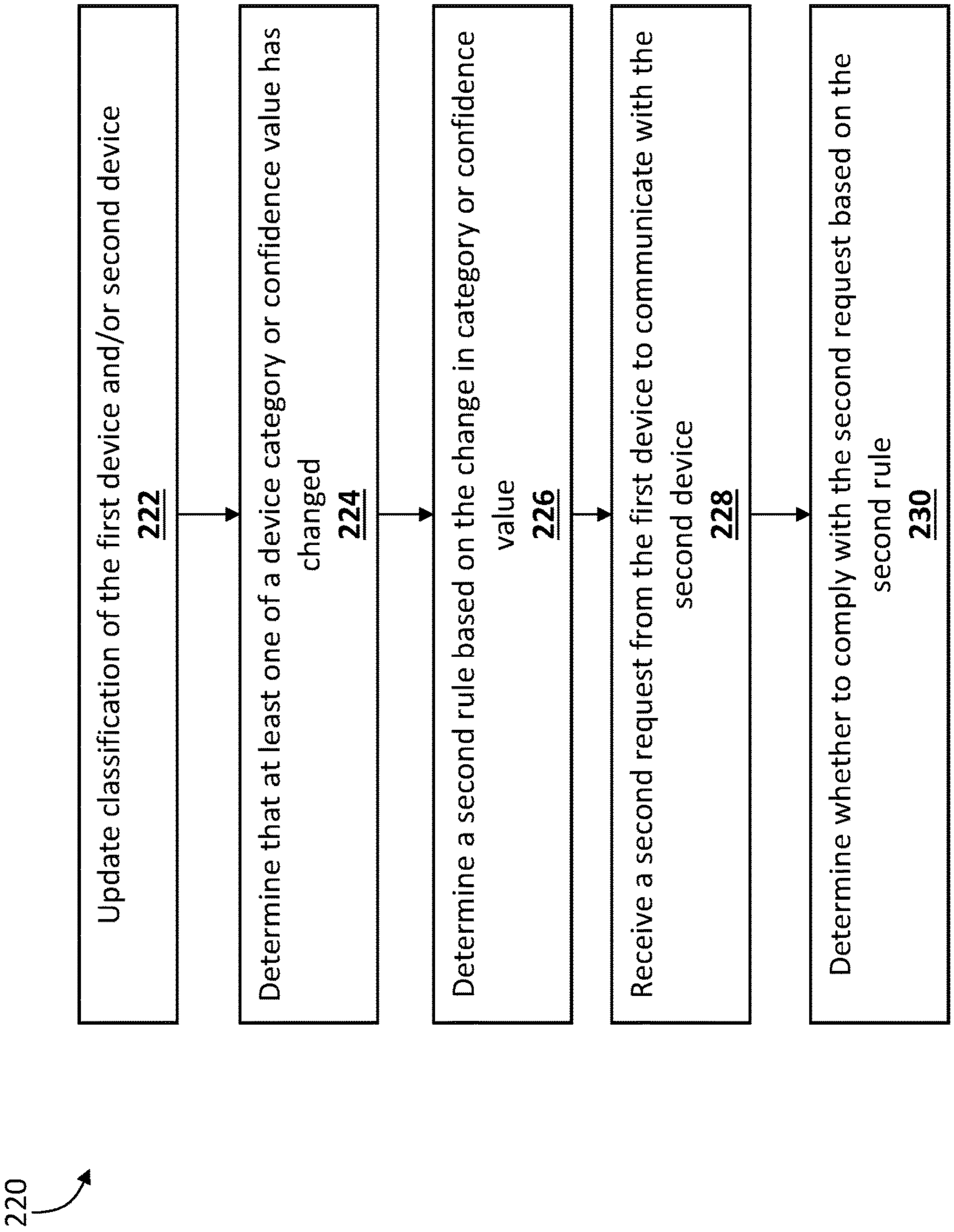
FIG. 2B is a flow chart of a method, according to an example of the present disclosure.

FIG. 2B is a flow chart of a method 220, in some examples. Method 220 may be used in conjunction with, for example, method 200. In examples, the method may be performed by one or more of categorizer 125, security device 110, and agent 120. The method may include updating, at operation 222, the classification of the first device and/or the second device. For example, after operation 216, the classification of the first and second devices may be updated. Operation 222 may, in examples, occur automatically and periodically as new information about the first and second devices 105 is received or checked. For example, a device 105 that is categorized in a first category may begin to exhibit behaviors (e.g., after having been compromised) that are inconsistent with the first category of devices. Categorizer 125 may, based on information that is received about the ongoing operation of device 105, determine at operation 224 that one or more of the device category or confidence value associated with the categorization has changed. In examples, the categorizer may update the list of devices and associated categories and confidence values stored at the agent 120 and/or security device 110 accordingly.

At operation 226, a determination may be made of a second rule affecting the permissibility of communications between the first device and the second device, based on the change in category of the first and/or second device and/or the associated confidence value(s). For example, the first device may be reclassified as a third category of device. Or the first device may remain classified as a first category of device, but the confidence value for such classification may be reduced based on observed behavior of the first device. In either event, the change may result in a determined second rule that the first device is no longer able to communicate with the second device through the security device.

At operation 228, a second request from the first device to communicate with the second device is received. At operation 230, a determination is made whether to comply with the second request based on the second rule. For example, even if the first device was previously permitted to communicate with the second device, the second rule may now prohibit such communication.

Figure 2C:
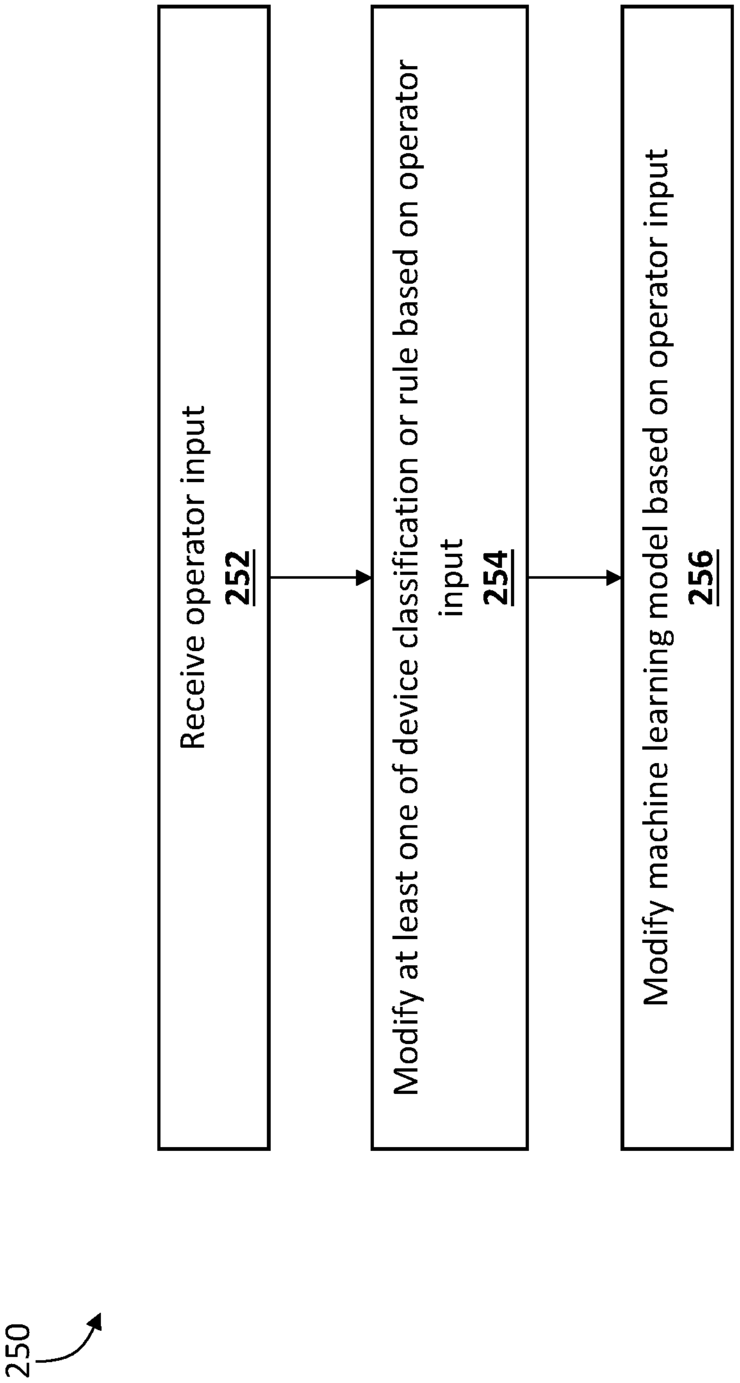
FIG. 2C is a flow chart of a method, according to an example of the present disclosure.

FIG. 2C is a flow chart illustrating a method 250, in some examples. Method 250 may, in examples, be used in conjunction with methods 200 and 220. In examples, the method 250 may be performed by one or more of categorizer 125, security device 110, and agent 120. The method may include receiving, at operation 252, operator input. As discussed, operator input may be received to affect the operation of system 100 in a variety of manners. For example, an operator may directly provide an initial classification of each device 105 through a user interface or otherwise. In other examples, operator input may include a modification to a previously defined classification (e.g., a classification that was automatically generated by categorizer 125 or previously defined by an operator).

Operator input that is received at operation 252 may also include definitions of rules applicable to communications between categories of devices. For example, operator input may be received through a user interface defining which categories are permitted to communicate with which other categories (and any conditions associated therewith, such as a minimum threshold confidence value, types of communications permitted, etc.). Operator input may also include overrides received from an operator. For example, if the system 100 does not permit a requested communication from a first device 105 to a second device 105, the denial may be logged, and an operator may be presented (e.g., in a user interface) a list of the denied requests. An operator may provide feedback to override, for example, a rule prohibiting a first device from communicating with a second device.

At operation 254, at least one of a classification or rule is modified based on operator input. As discussed, classifications that have previously been made (manually or automatically) may be adjusted by operator input. For example, the categorizer 125 may classify a device as a "new device" prior to having sufficient information about the device's behavior, which might otherwise result in the device having very limited permissions to communicate with other devices on the network. Operator input may be used to modify the classification of the device if the operator is otherwise familiar with the device and its intended purpose, for example. In examples, operator input may also be used to modify the confidence value associated with a classification. For example, a device that has been specifically classified into a category by an authorized operator may be associated with a high confidence value. In other examples, the rules applicable to particular device(s) or category(ies) may be similarly modified based on operator input.

At operation 256, a machine-learning model may be modified based on operator input. As discussed, operator input may be used to reclassify a device to a different category than was previously assigned by classifier 125. In examples where classifier 125 employs a machine-learning model, the corrections in classification may be fed back to the classifier 125 to improve the model, among other possibilities.

Figure 3:
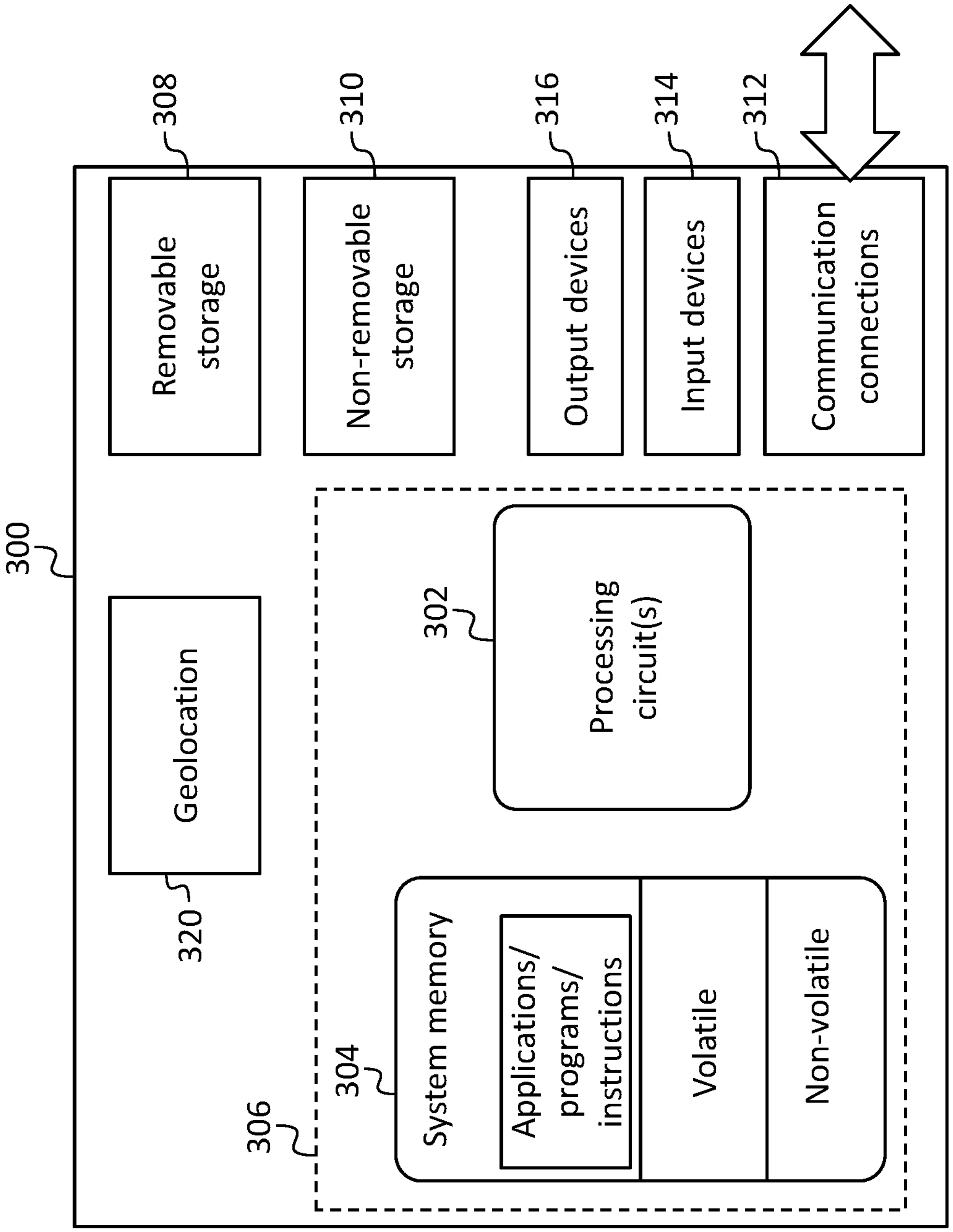
FIG. 3 is a block diagram of an operating environment, according to an example of the present disclosure.

FIG. 3 depicts an example of a suitable operating environment 300, portions of which may be used to implement the devices 105, the security device 110, the agent 120, the AI categorizer 125, or other computing devices within the systems discussed herein. In its most basic configuration, operating environment 300 typically includes at least one processing circuit 302 and memory 304. The processing circuit may be a processor, which is hardware. Depending on the exact configuration and type of computing device, memory 304 (storing instructions to perform the methods disclosed herein) may be volatile (such as RAM), non-volatile (such as ROM, flash memory, etc.), or some combination of the two. This most basic configuration is illustrated in FIG. 3 by dashed line 306. The memory 304 stores instructions that, when executed by the processing circuit(s) 302, perform the processes and operations described herein. Further, environment 300 may also include storage (removable 308, or non-removable 310) including, but not limited to, solid-state, magnetic disks, optical disks, or tape. Similarly, environment 300 may also have input device(s) 314 such as keyboard, mouse, pen, voice input, etc., or output device(s) 316 such as a display, speakers, printer, etc. Additional communication connections 312 may also be included that allow for further communication with LAN, WAN, point-to-point, etc. Operating environment 300 may also include geolocation devices 320, such as a global positioning system (GPS) device.

Operating environment 300 typically includes at least some form of computer readable media. Computer readable media can be any available media that can be accessed by processing circuit 302 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media is non-transitory and does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of any of the above should also be included within the scope of computer readable media.

Although some examples are described herein in the context of a WiFi network, the present disclosure is not limited to such a network and, for example, the systems and methods described herein may be employed to similar or identical effect in other wireless or wired networks. As used herein, the word "or" is inclusive, so that, for example, "A or B" means any one of (i) A, (ii) B, and (iii) A and B. As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity. As used herein, when an action is performed "in response to" an event or condition, the event or condition may or may not be necessary to trigger the performance of the action and the event or condition may or may not be sufficient to trigger the performance of the action. For example, if the occurrence of a first event and a second event triggers the performance of an action, it may be said that the action is performed in response to the first event and that it is further performed in response to the second event.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

Although exemplary embodiments of systems and methods for automatic isolation of electronic devices have been specifically described and illustrated herein, many modifications and variations will be apparent to those skilled in the art. Accordingly, it is to be understood that systems and methods for automatic isolation of electronic devices constructed according to principles of this disclosure may be embodied other than as specifically described herein. The invention is also defined in the following claims, and equivalents thereof.

What is claimed is:

1. A method, comprising:

receiving, by a security device, from a first device, a request to communicate with a second device via a single network, wherein the first device and the second device are members of the single network;

determining that the requested communication is not authorized; and not complying with the request, wherein the determining that the requested communication is not authorized comprises:

determining that the first device is a member of a first category of devices;

determining that the second device is a member of a second category of devices, different from the first category of devices; and applying, by the security device, a rule prohibiting the first category of devices from communicating with the second category of devices in the single network, and wherein not complying with the request includes performing, by the security device, one or more security actions as a result of non-compliance.

2. The method of claim 1, wherein the request to communicate comprises an Address Resolution Protocol request for the second device.

3. The method of claim 1, wherein the request to communicate comprises a packet addressed to the second device.

4. The method of claim 1, wherein the first device is in a broadcast domain, and the second device is in the broadcast domain.

5. The method of claim 1, further comprising:

classifying the first device as a member of the first category of devices.

6. The method of claim 5, wherein the classifying of the first device as a member of the first category of devices comprises using a passive method for characterizing the first device.

7. The method of claim 6, wherein the passive method comprises monitoring packets transmitted by the first device.

8. The method of claim 5, wherein the classifying of the first device as a member of the first category of devices comprises using an active method for characterizing the first device.

9. The method of claim 8, wherein the active method comprises port scanning.

10. The method of claim 5, wherein the classifying of the first device as a member of the first category of devices comprises using a machine learning model.

11. The method of claim 10, wherein the machine learning model generates a categorization and a first confidence value.

12. The method of claim 11, further comprising:

classifying the first device as a member of a third category of devices;

in response to classifying the first device as a member of the third category of devices, determining a second rule enforcing a set of different permissions granted to the first device by the security device;

receiving a second request from the first device to communicate with the second device; and determining whether to permit the second request based on the second rule.

13. The method of claim 11, further comprising:

classifying, with a different confidence value than the first confidence value, the first device as a member of the first category of devices;

receiving a second request from the first device to communicate with the second device; and determining whether to permit the second request based on the rule and the different confidence value; and permitting the second request to communicate.

14. The method of claim 5, further comprising:

receiving operator input from an operator;

wherein the rule is based on the operator input, and the classifying of the first device as a member of the first category is based on the operator input.

15. The method of claim 14, further comprising modifying a machine learning model based on the operator input.

16. The method of claim 5, further comprising:

defining one or more permissions for the first device, based on the classifying of the first device as a member of the first category of devices; and determining the rule based on the one or more permissions.

17. The method of claim 16, further comprising receiving operator input from an operator, wherein determining the rule is further based on the operator input.

18. The method of claim 1, wherein the second category of devices is a category of newly connected devices.

19. A security device, comprising:

at least one processor; and memory, operatively connected to the at least one processor and storing instructions that, when executed by the at least one processor, cause the security device to perform a method, the method comprising:

receiving, from a first device, a request to communicate with a second device via a single network, wherein the first device and the second device are members of the single network;

determining that the requested communication is not authorized; and not complying with the request;

wherein the determining that the requested communication is not authorized comprises:

determining that the first device is a member of a first category of devices;

determining that the second device is a member of a second category of devices, different from the first category of devices; and applying, by the security device, a rule prohibiting the first category of devices from communicating with the second category of devices in the single network, and wherein not complying with the request includes performing, by the security device, one or more security actions as a result of non-compliance.

* * * * *